United States Patent [19]

Tully

[11] 4,371,555

[45] Feb. 1, 1983

[54] METHOD FOR DYEING EGGS

[76] Inventor: Paul R. Tully, 42 Windward Rd., Lowell, Mass. 01852

[21] Appl. No.: 313,834

[22] Filed: Oct. 22, 1981

[51] Int. Cl.[3] .................... A23L 1/275; A23L 1/321
[52] U.S. Cl. .................... 426/250; 426/540; 426/614; 426/383; 426/291; 426/298; 426/104
[58] Field of Search ............ 426/250, 540, 614, 383, 426/291, 298, 300, 301, 104

[56] References Cited

U.S. PATENT DOCUMENTS

| | | | |
|---|---|---|---|
| 1,538,367 | 5/1925 | Young | 426/250 |
| 1,829,689 | 10/1931 | Townley et al. | 426/250 |
| 1,935,901 | 11/1933 | Augenblick | 426/540 |
| 1,952,612 | 3/1934 | Sherwood | 426/250 |
| 1,982,820 | 12/1934 | Lowenstein | 426/250 |
| 2,074,376 | 3/1937 | Dorcey | 426/250 |
| 2,199,201 | 4/1940 | Heden | 426/540 |
| 2,593,566 | 4/1952 | Kamp | 426/540 |
| 4,181,745 | 1/1980 | Growe et al. | 426/383 |

*Primary Examiner*—Jeanette M. Hunter
*Attorney, Agent, or Firm*—Kenneth W. Brown

[57] ABSTRACT

There is disclosed a method for dyeing avian eggs whereby a pleasing decorative mottled appearance results. The method involves the temporary application of a hydrophobic granular water-insoluble solid to the eggshell followed by dyeing of the egg utilizing a conventional aqueous dyestuff. The granular solid is removed from the egg following the dyeing step.

10 Claims, No Drawings

METHOD FOR DYEING EGGS

BACKGROUND OF THE INVENTION

The present invention relates broadly to the decorative coloring of avian eggs and is more particularly concerned with a method for producing attractive mottled dye effects thereon.

Conventionally, avian eggs such as chicken, duck turkey or goose eggs, are decoratively colored by dyeing with an aqueous dyestuff, generally in hot acidic solution. The dyestuff normally penetrates relatively uniformly into the eggshell, thereby producing a dyed surface of substantially uniform hue. In accordance with the present invention, however, there is provided a method for decoratively dyeing avian eggs whereby there results a pleasing mottled coloration thereof.

SUMMARY OF THE INVENTION

The method of the invention broadly comprises: applying a thin coating of a comestible oil to the eggshell; temporarily adhering through the agency of said oil coating a hydrophobic, water-insoluble granular solid to that portion or portions of the eggshell selected to be of mottled appearance; dyeing the egg in a conventional manner utilizing an aqueous dyestuff and, thereafter, removing the temporarily adhered hydrophobic granular solid therefrom. During the course of the dyeing step the temporarily adhered hydrophobic granular solid acts as a dye resist, thereby preventing the dyestuff from interacting with the eggshell underlying the hydrophobic granules. In consequence, the portions of the eggshell underlying the granules remain essentially undyed. The method of the invention can be applied to a previously uniformly dyed egg and/or can be practiced repetitively in one or more sequences utilizing differently colored dyestuffs, the adhered hydrophobic granules in each such sequence preventing the particular dyestuff of that sequence from masking the previous color or hue underlying said granules.

DESCRIPTION OF PREFERRED EMBODIMENTS OF THE INVENTION

Substantially any comestible oil can be employed in coating the eggshell. Thus, for instance, cooking and shortening oils such as safflower oil, soybean oil, corn oil, peanut oil, olive oil or melted shortenings such as oleomargarine, butter or hydrogenated oil shortenings can be successfully utilized in the practice of the invention. The specific method utilized in the coating of the eggshell with the oil is, likewise, largely uncritical, it being of consequence only to the extent that the resulting oil coating should be sufficiently thin as to avoid dripping or draining thereof from the shell during or after application of the hydrophobic granular solid thereto. Generally speaking, it has been found adequate to simply brush the oil onto the surface of the shell and then allow the resulting coating to drain until no dripping of the oil is noted. Thereafter, the hydrophobic solid may be applied and temporarily adhered to the eggshell through the agency of the remaining oil film.

The hydrophobic granular solid employed in the practice of the invention is produced by coating a relatively coarse water-insoluble granular solid with a colloidal hydrophobic metal or metalloid oxide. A complete description of a suitable method for such coating of water-insoluble granular solids so as to render them hydrophobic is contained in U.S. Pat. No. 3,562,153, Tully et al., Feb. 9, 1971, entitled *OIL ABSORBENT COMPOSITIONS*, the entire disclosure of said patent being incorporated herein by reference. In a preferred embodiment of the instant invention the hydrophobic colloidal metal or metalloid oxide consists of a pyrogenic silica rendered hydrophobic by treatment thereof with a reactive organosilicon compound. Such hydrophobic silicas and methods for producing same are also more fully described in the above-cited patent. In another preferred embodiment of the invention the colloidal hydrophobic metal or metalloid oxide is secured to the water-insoluble granular solid by means of a suitable water-insoluble adhesive, such as an epoxy, polyester or reactive silicone fluid adhesive. A more complete description of the preparation of hydrophobic granular solids in this manner is contained in my U.S. Pat. No. 4,004,368, Jan. 25, 1977, entitled *AGRICULTURAL SOIL COMPOSITIONS*, Col. 2, lines 29 through 56, the cited portion of this patent also being incorporated herein by reference. The water-insoluble granular solid employed in the practice of the present invention can be of substantially any suitable average grain size or grain size distribution. For instance, I have found granular solids having average grain sizes of from about 0.05 and about 0.7 mm. to be generally entirely suitable. Of course, the larger the average grain size of the starting material granular solid, the larger will tend to be the mottles produced on the dyed egg prepared in accordance with the invention. Too, the narrower the grain size distribution of the granular solid, the more uniform will be the size of the mottles produced on the eggshell. A particularly convenient granular solid for use in the invention is sand, particularly a sand which has been water washed and screened or sieved to provide a relatively narrow grain size distribution. For example, a water washed sand having a Tyler Sieve analysis of $-20+270$ (ASTM C 371-77) has been found to be an entirely acceptable starting material granular solid for purposes of the invention. However, it should be borne in mind that other water-insoluble granular solids, such as nut shells, coffee grounds, crushed charcoal, expanded mica, fired ceramic grains, polymeric pellets and granules and the like can also be utilized.

Application of the hydrophobic granular solid to the oiled eggshell can be undertaken in any desired manner, such as by rolling the egg in the granular solid or by sprinkling the solid onto the eggshell. Of course, where it is desired that only a selected portion or portions of the eggshell exhibit the mottled dye effect, the hydrophobic granular solid should be adhered only to that portion or portions. This may be done by careful application of the solid to the desired portion or portions of the oiled eggshell or, in the alternative, the comestible oil may be selectively applied only to such selected portion or portions of the eggshell. In the latter instance the granular solid, however indiscriminately applied, will adhere only to the selectively oiled portion or portions of the eggshell.

After temporarily adhering the hydrophobic granular solid to the eggshell, the egg is then subjected to a conventional egg dyeing step utilizing a conventional aqueous dyestuff. Suitable aqueous dyestuffs or food dyes for use in the invention are produced commercially by such manufacturers as McCormick & Co., Inc, Baltimore, MD 21202 and are generally widely available through many retail food stores and markets.

After the dyeing step, of course, the egg is dried and the temporarily adhered hydrophobic granular solid removed therefrom. Generally, the granular solid so removed may be collected and reused a number of times without adverse affect.

What is claimed is:

1. A process for preparing a colored avian egg having a mottled decorative appearance which comprises:

applying a thin coating of a comestible oil onto the eggshell;

temporarily adhering a hydrophobic water-insoluble granular solid to the oil-coated eggshell;

dyeing the grain-coated egg by applying thereto an aqueous dyestuff; and removing the temporarily adhered granular solid from the dyed egg.

2. The process of claim 1 wherein the water-insoluble granular solid has an average grain size of between about 0.05 and about 0.7 mm.

3. The process of claim 1 wherein the water-insoluble granular solid is rendered hydrophobic by coating thereof with a hydrophobic colloidal metal or metalloid oxide.

4. The process of claim 3 wherein the hydrophobic metal or metalloid oxide is a fumed silica rendered hydrophobic by treatment thereof with a reactive organosilicon compound.

5. The process of claim 3 wherein said hydrophobic metal or metalloid oxide is secured to said granular solid by means of a water-insoluble adhesive.

6. The process of claim 1 wherein said granular solid is sand.

7. The process of claim 1 wherein a preselected portion of the egg is dyed to said mottled appearance by adhering said hydrophobic water insoluble granular solid only to said preselected portion.

8. The process of claim 1 wherein said egg has been previously dyed.

9. A process for preparing a colored avian egg having a mottled decorative appearance which comprises:

applying a thin coating of a comestible oil onto the eggshell;

temporarily adhering to the oil-coated eggshell a hydrophobic sand, said sand having been rendered hydrophobic by coating thereof with a hydrophobic organosilicon compound-treated fumed silica;

dyeing the sand-coated egg by applying thereto an aqueous dyestuff and removing the temporarily adhered hydrophobic sand from the dyed egg.

10. The process of claim 9 wherein said sand has a Tyler Sieve analysis of $-20+270$.

* * * * *